Oct. 23, 1962 MASUMI AIHARA 3,060,014
MULTI-FURNACE FOR REFINING METAL
Filed April 14, 1959 4 Sheets-Sheet 1

INVENTOR.

BY MASUMI AIHARA

Wenderoth, Lind & Ponach
Attys.

INVENTOR.
BY MASUMI AIHARA

Oct. 23, 1962 MASUMI AIHARA 3,060,014
MULTI-FURNACE FOR REFINING METAL
Filed April 14, 1959 4 Sheets-Sheet 4

INVENTOR
*Masumi Aihara*
by Wenderoth, Lind and Ponack
Attorneys

United States Patent Office 3,060,014
Patented Oct. 23, 1962

3,060,014
MULTI-FURNACE FOR REFINING METAL
Masumi Aihara, Takamicho, Yawata City, Japan, assignor to Yawata Iron and Steel Co., Ltd., Tokyo, Japan, a corporation of Japan
Filed Apr. 14, 1959, Ser. No. 806,262
Claims priority, application Japan Apr. 17, 1958
2 Claims. (Cl. 75—43)

The present invention relates to a process of metal refining in a multi-furnace and apparatus therefor.

The term, "multi-furnace," is used herein to denote that a multi-furnace consists of two furnaces connected to each other in abutting relationship with their sides as a common joint.

Recently, steel production as well as enhancement of steel quality have been contemplated by the introduction of a considerable amount of oxygen into the open-hearth furnace. It is known that hot waste gases resulting from the combustion of oxygen in the open-hearth furnace contain a vast amount of combustible matter. Accordingly, it is quite advantageous for steel manufacture to recover and utilize the heat energy of waste gases and also the considerable quantity of combustibles therein resulting from the steel making process by means of oxygen introduction in the open-hearth furnace. The waste gases and reaction products from the above process have such elevated temperatures as 1550° C. In addition, the reaction gases produced in the oxygen steel making process contain 80–90% CO by volume, which can be utilized for fuel.

However, the heat energy of these waste gases have hitherto never been recovered in a satisfactory manner. It is recovered merely in the regenerative chambers or waste heat boiler of the open-hearth furnace plant at large. Any means for recovering the above-mentioned heat energy completely in a satisfactory manner has never been proposed.

In the present-day steel making process in an open-hearth furnace, regenerative chambers are required in order to preheat the cold incoming air for combustion and the fuel gas, if necessary, so as to increase the temperature of the flame by a very considerable amount above that which could be obtained by burning the same fuel without preheating the combustion air, and the above regenerative chambers are complicated in its construction which result in a high cost of construction.

I have discovered that the above disadvantages resulting from the present-day construction of an open-hearth furnace are overcome by providing a multi-furnace having no regenerative chamber therein which consists of two furnaces arranged in abutting relationship.

In the conventional open-hearth furnace to which oxygen is applied, oxygen impinges on the surface of the molten bath to remove impurities therefrom, and CO, one of the gaseous products, burns either in the furnace chamber or escapes out of it. Hence the furnace proper is subjected to the erosion resulting from the high temperatures due to the combustion of CO. Further, there is also a disadvantage that an efficient heat recovery due to regenerative chambers is prevented from the presence of a large amount of oxide particles in the waste gases produced in the steel making process in the open-hearth furnace to which oxygen is employed.

In accordance with the process of the invention, oxygen is caused to impinge on the surface of the molten steel bath in the hearth of one furnace chamber in an oblique direction from a burner provided on an end of the furnace chamber of the multi-furnace, then CO gas is produced in the furnace chamber by the impingement of oxygen on the bath, and this CO gas is rapidly transferred to the other furnace chamber through the communicating passage provided on the common joint of the multi-furnace due to the evacuating action caused by the exhaust through the stack at the bottom of which there is always the reduced pressure until the reversal of the reversal valve which is provided on the flue. In this way, the above disadvantages are overcome and I have succeeded in recovering the waste heat by the above process that an alternate melting operation can be performed in each hearth of the multi-furnace of my invention in a different period of time.

Thus I have attained the improvement of the heat efficiency hitherto unable to obtain through the process of my invention which comprises recovering waste heat and combustibles in the waste gases produced by the oxygen steel making method in an open-hearth furnace. In addition, regenerative chambers and ancillary apparatus therefor which are indispensable for the conventional open-hearth furnace are not required in the multi-furnace of my invention, hence the complicated and expensive construction of the open-hearth furnace can be considerably simplified so as to perform a steel making process in an economical manner.

An object of the invention is to provide a novel multi-furnace consisting of two furnace chambers, each of which is almost similar to a conventional open-hearth furnace in its construction with no regenerative chambers at all.

Another object of the invention is to provide a novel steel making process which comprises melting metal in one furnace chamber of the multi-furnace heated by the waste gas introduced from the other where the metal has been already melted down, and repeating this melting process by the aid of the waste gas in each furnace chamber alternately.

Another object of the invention is to provide a novel steel making process which comprises providing a multi-furnace consisting of two furnace chambers arranged in abutting relationship in which a plurality of burners for fuel as well as oxygen are provided on the main roof of each furnace chamber and a communicating passage is provided on the upper part of the joint between two furnace chambers, introducing a combustible waste gas produced in one furnace chamber into the other so as to melt a fresh charge, and repeating the above melting process by the aid of the waste gas in each furnace chamber alternately.

Other objects and advantages of the invention will become apparent from the following description in reference to the accompanying drawings which show the multi-furnace somewhat diagrammatically for the purpose of clarity, and in which.

Figure 1:
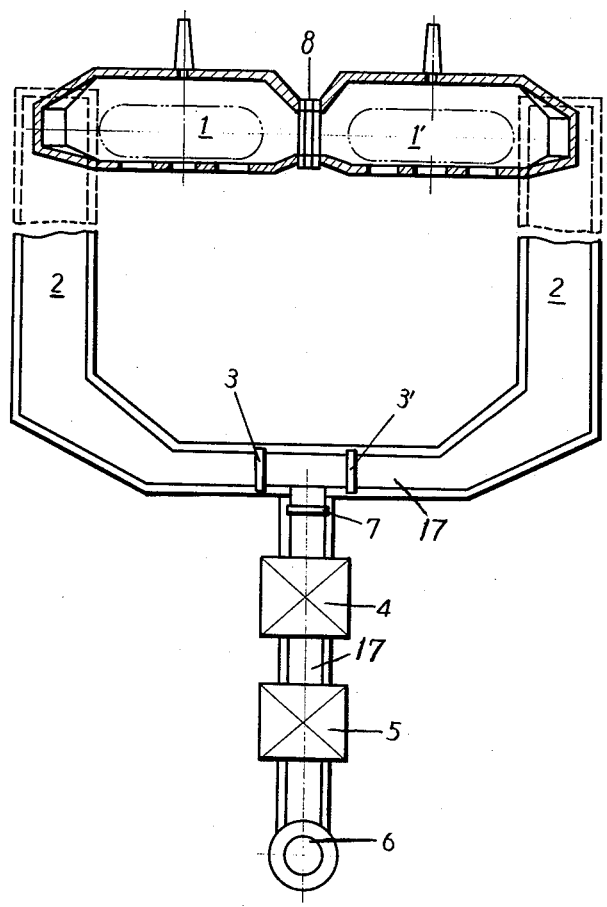
FIG. 1 is a plan view of the multi-furnace and its ancillary apparatus embodying a preferred process of the invention.
Figure 2:
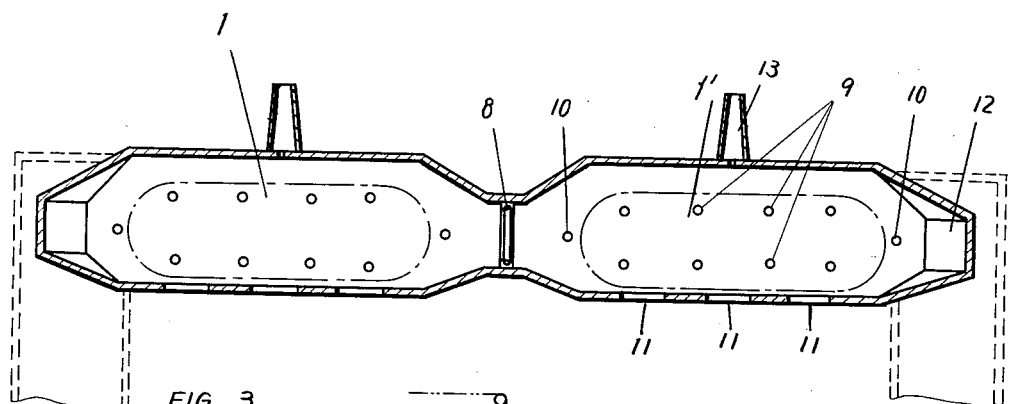
FIG. 2 is a horizontal, sectional view of the multi-furnace shown in FIG. 1.
Figure 3:
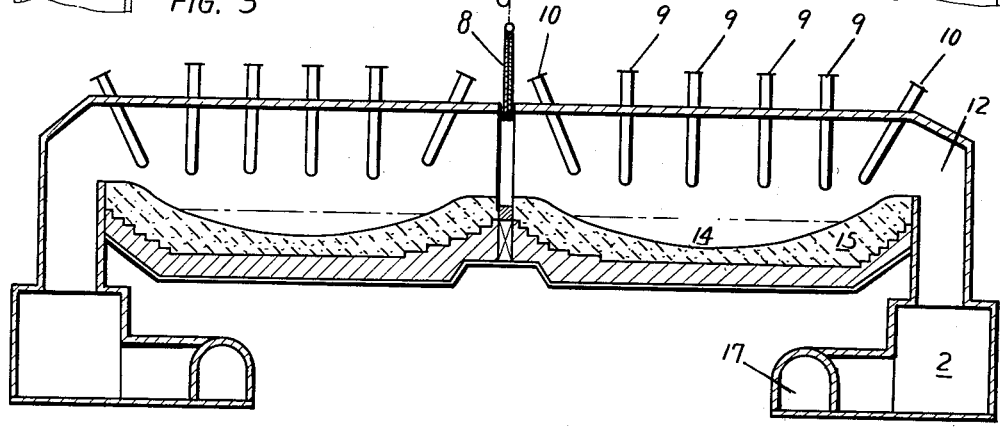
FIG. 3 is a longitudinal sectional view of the same.
Figure 4:
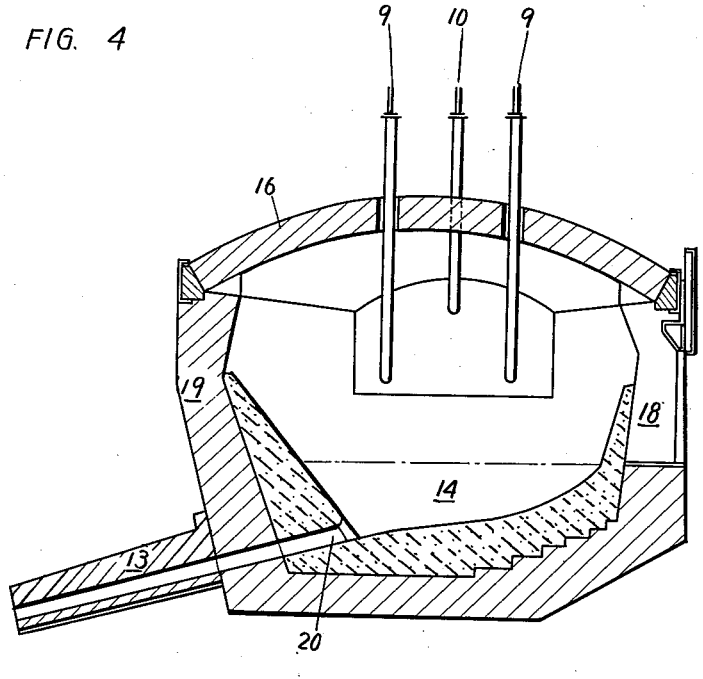
FIG. 4 is a side elevation of the same.

Referring to FIGS. 1–4, inclusive, illustrating a multi-furnace of the invention, two furnace chambers 1, 1' are connected to each other in abutting relationship as shown, and a damper 8 having a communicating passage therebetween is provided on the upper part of the chambers at the connecting joint thereof. The construction of each of the furnace chambers is almost the same as a conventional open-hearth furnace, but devoid of regenerative chambers. A hearth 15 of the refractory material is provided on the bottom firebrick of the furnace to receive the molten steel bath 14. The front wall 18, back wall 19, and main roof 16, all of which are made of refractory materials, form a melting chamber in the furnace. On the main roof 16 are inserted a plurality of main and auxiliary burners 9, 10 which direct into the hearth 15 in order to cause impingement of oxygen and fuel onto the charge in each of the furnace chambers. Just like the conventional open-hearth furnace, a plurality of charging doors 11 are provided on the front wall of the furnace and a tap-hole 20 with a tapping spout 13 is also provided on the back wall thereof, respectively. At both end walls of the multi-furnace, that is to say, at one end of a furnace chamber, respectively, there is provided a downtake 12 for waste gas which communicates with a stack 17, through a flue 2.

It is clear from the drawings, regenerative chambers which constitute an indispensable part of the present-day open-hearth furnace communicating with the flue 2 are dispensed with in the novel construction of the multi-furnace of my invention. The lower part of the waste gas downtake 12 may be used as a dump for slag and dust contained in the waste gas.

The flue section 17 is provided with reversing valves 3, 3', a damper 7 for controlling the pressure in each of the furnace chambers, a waste heat boiler 4, and a dust catcher 5, finally leading to the stack 6.

In operation, a cold charge is introduced into one 1 of the furnace chambers of the multi-furnace, heated to melt it, then a molten pig iron is charged thereto. The temperature of the charge in the furnace is increased by the impingement of oxygen through the main burners 9 on it when the hot combustible waste gas is produced in this furnace, then the waste gas is caused to introduce into the other furnace 1' through the communicating passage provided on the damper 8. At this time, the reversing valve 3 is closed, and the other reversing valve 3' is opened. The waste gas produced thereby contains about 80-90% CO by volume, analysis of which is as follows, and sufficient for fuel.

| CO₂ | O₂ | CO | Remainder |
|---|---|---|---|
| Percent | | Percent | Percent |
| 10.5 | -------- | 88.5 | 1.0 |
| 11.0 | -------- | 87.2 | 1.8 |
| 11.0 | -------- | 87.4 | 1.6 |

Tthe other furnace chamber 1' has been charged with ore, scrap, and other cold materials, all of which is now melted down by the hot waste gas delivered thereto from the furnace chamber 1 as its principal heat energy. If the heat energy runs short in this event, ovygen as well as fuel is blown into the charge from the burners, 9 and 10, respectively. It is understood that oxygen required for burning the waste gas introduced from the adjoining furnace 1 is delivered from the burner.

When the molten charge in the furnace 1 is refined by the application of oxygen to attain the desired composition of steel, the steel is tapped. At the same time, pig iron is charged into the other furnace 1' when the cold charge becomes so hot that it is ready to receive the molten pig iron. This point of time is preferred as a turning point in the process of the invention, and the melting operation of each of the furnaces 1 and 1' is reversed in such manner that the direction of the waste gas is reversed by the reversing valves 3 and 3', which results in that the cold charge in the furnace 1 is melted by the waste gas delivered from the furnace 1'. In this way, charging as well as heating is performed simultaneously on the one hand while melting as well as refining on the other hand.

Further, when either of the furnace chambers is under repairs, only one of them may be in operation for steel manufacture.

Figure 5:
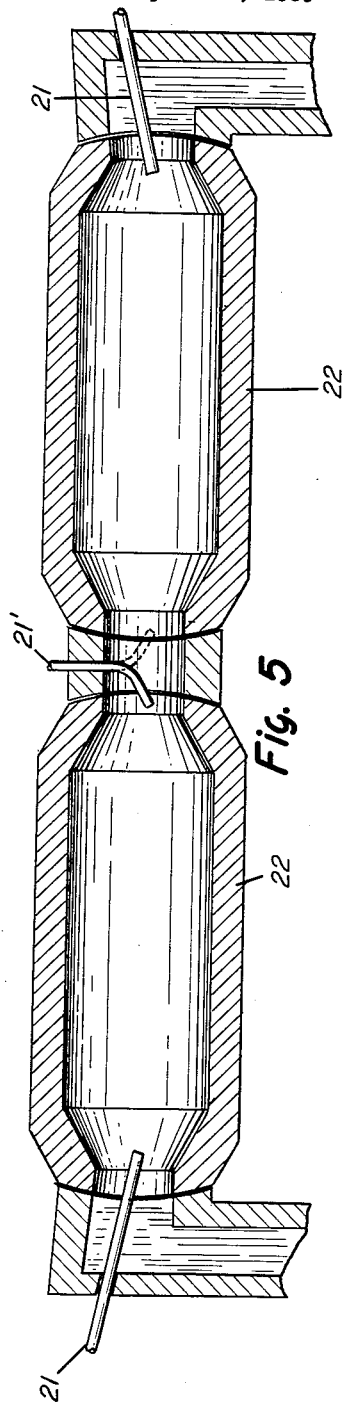
FIG. 5 is a sectional view of the multi-furnace applied to a rotary furnace illustrating a modified embodiment of the invention.
Figure 6:
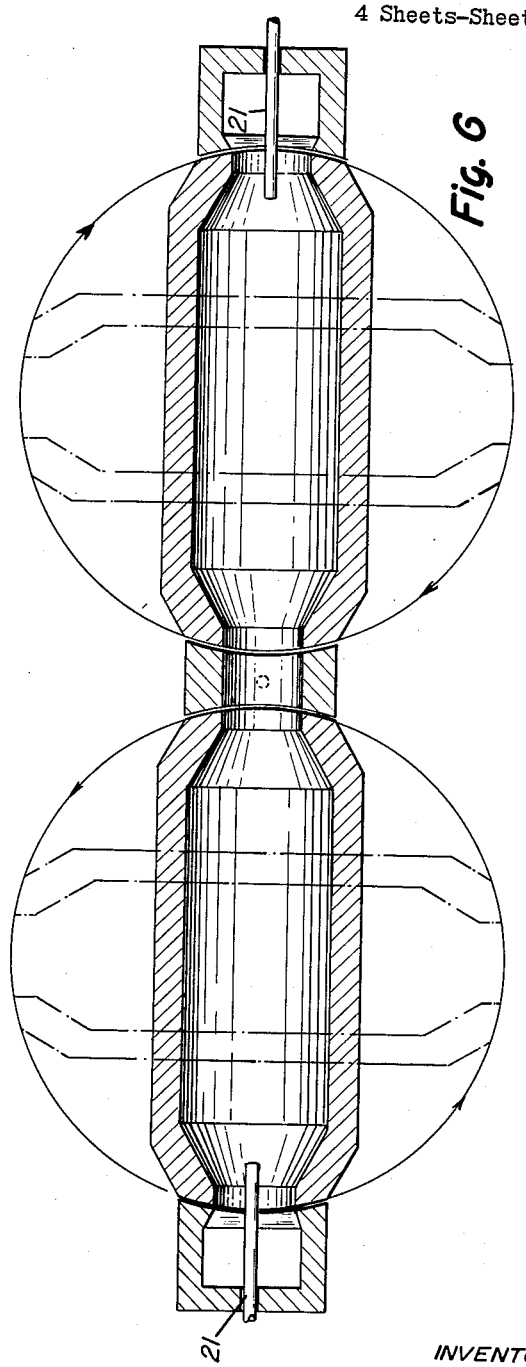
FIG. 6 is a plan view of FIG. 5.

In a modified embodiment of the invention as shown in FIGS. 5-6, a plan view and a section thereof, in which a rotary furnace 22 provided an oxygen burner 21 is arranged in abutting relationship with the other rotary furnace 22 provided also with an oxygen burner 21. Either of the rotary furnaces is heated by the oxygen burner. The furnace proper 22 is so constructed that a charge can be supplied thereinto during the rotation of the furnace around the longitudinal axis at its center. Further, the furnace turns horizontally in the direction at right angles around the axis when it is time for tapping, and besides, it may tilt as desired.

In operation, the process of the above modified multi-furnace consisting of two rotary furnaces is almost the same as that of the multi-furnace consisting of two open-hearth furnaces described hereinbefore. However, when one rotary furnace is being either charged or tapped in the direction at right angles to the common axis, the other rotary furnace is heated by the central burn 21' provided at the joint between two rotary furnaces in order to melt the charge. In addition the central burner 21' functions to deliver oxygen with a view to accelerating the combustion in either of the furnaces into which the waste gas is supplied from the preceding furnace where the first charge has been melted. A burner 21 provided on one end wall of the furnace serves the same purpose as the burner 10 of the multi-furnace to cause impingement of oxygen on the charge in the furnace in the oblique direction to remove impurities therefrom.

Although I have disclosed herein the preferred practice and embodiment of my invention, I intended to cover as well any change or modification therein which may be made without departing from the spirit and scope of the invention.

I claim:
1. A method of making steel, comprising placing only a charge of cold material, consisting essentially of iron ore, scrap iron and steel and pig iron, to be melted in a first furnace adjacent to a second furnace which contains a molten charge to which molten pig iron has been added, directing a stream of oxygen against the molten charge in the second furnace to refine it and thereby generating combustible waste gas, passing the waste gas into the first furnace and burning it therein, thereby melting the cold charge therein by combustion of said waste gas, thereafter emptying the second furnace and reloading it only with a charge of cold material consisting essentially of iron ore, scrap iron and steel and pig iron to be melted, adding molten pig iron to the melted charge in the first furnace, directing a stream of oxygen against the molten charge in the first furnace to refine it and thereby generating combustible waste gas, passing the last-mentioned waste gas into the second furnace and burning it therein, thereby melting the cold charge therein by combustion of said waste gas, and continuously repeating the foregoing steps in the sequence set forth.

2. A method as claimed in claim 1 including the step of adding oxygen to the waste gases.

References Cited in the file of this patent

UNITED STATES PATENTS

| | | |
|---|---|---|
| 876,275 | Koch | Jan. 7, 1908 |
| 1,572,336 | Vogt et al. | Feb. 9, 1926 |
| 1,729,230 | Talbot | Sept. 24, 1929 |
| 1,913,197 | Freeland | June 6, 1933 |
| 2,515,670 | Slottman et al. | July 18, 1950 |
| 2,616,679 | Morgan | Nov. 4, 1952 |
| 2,671,724 | Kompart | Mar. 9, 1954 |
| 2,818,247 | Francis | Dec. 31, 1957 |
| 2,940,744 | Swenson | June 14, 1960 |